United States Patent [19]
Thurston et al.

[11] Patent Number: 6,035,206
[45] Date of Patent: Mar. 7, 2000

[54] METHOD AND APPARATUS FOR TRANSMITTING MULTIPLE COMMUNICATION MESSAGES ON A COMMUNICATION RESOURCE

[75] Inventors: Jeffrey F. Thurston, Lake Zurich; David P. Helm, Carol Stream, both of Ill.

[73] Assignee: Motorola, Inc., Schaumburg, Ill.

[21] Appl. No.: 08/962,198

[22] Filed: Oct. 31, 1997

[51] Int. Cl.[7] .................................................. H04Q 7/06

[52] U.S. Cl. ........................ 455/503; 455/422; 455/525

[58] Field of Search ............................... 455/422, 525; 370/252, 350, 503, 504, 516, 517; 379/92.01, 92.02

[56] References Cited

U.S. PATENT DOCUMENTS

| | | | |
|---|---|---|---|
| 5,162,790 | 11/1992 | Jasinski | 455/16 |
| 5,423,059 | 6/1995 | LoGalbo et al. | 455/503 |
| 5,590,403 | 12/1996 | Cameron et al. | 455/503 |
| 5,745,484 | 4/1998 | Scott | 370/350 |

*Primary Examiner*—Wellington Chin
*Assistant Examiner*—Yemane Woldetatios
*Attorney, Agent, or Firm*—Susan L. Lukasik; Steven R. Santema

[57] ABSTRACT

An apparatus (109) for and method of voting provides efficient use of communication resources (111, 112), while avoiding interference caused by other signal sources, particularly in a simulcast system. Although the same communication resource (111) is used for transmission on multiple base stations or repeaters (103, 105, 107, 113) at the same time in a simulcast system, the present invention provides way to achieve increased signal throughput without causing interference (213, 301) with desired signals (215, 211).

21 Claims, 4 Drawing Sheets

METHOD AND APPARATUS FOR TRANSMITTING MULTIPLE COMMUNICATION MESSAGES ON A COMMUNICATION RESOURCE

FIELD OF THE INVENTION

This invention relates to communication systems, including but not limited to radio frequency (RF) communication systems.

BACKGROUND OF THE INVENTION

In many radio communication systems designed to service a large area, it is often desirable to provide a number of receivers, each positioned at a different location within the area to be serviced. Typically, the receivers, which may be base stations or repeaters, have overlapping effective reception ranges so that any messages transmitted within the area will be picked up by at least one receiver on the same frequency or channel. As an example of such a system, a communication unit transmits via a radio frequency (RF) communication resource a message that is received by three remote receivers. Each of the receivers sends its received signal to a comparator, also known as a voter, typically by wireline communications. The comparator receives and compares each message from each of the receivers and outputs a message that is comprised of either an entire message from one of the receivers or a composite message comprised of segments of the messages received from one or more of the receivers. Each message may be comprised of a plurality of message frames.

In RF communication systems, it is sometimes desirable to be able to transmit different messages consecutively from the same base station, in order to more effectively utilize the communication resources of the base station. Such transmissions, however, may be subject to interference caused by other base stations keying or dekeying on the same channel, particularly in the simulcast system.

Accordingly, there is a need for a method of voting that provides efficient use of communication resources, while avoiding interference caused by other signal sources, particularly in a simulcast system.

DESCRIPTION OF A PREFERRED EMBODIMENT

Figure 1:
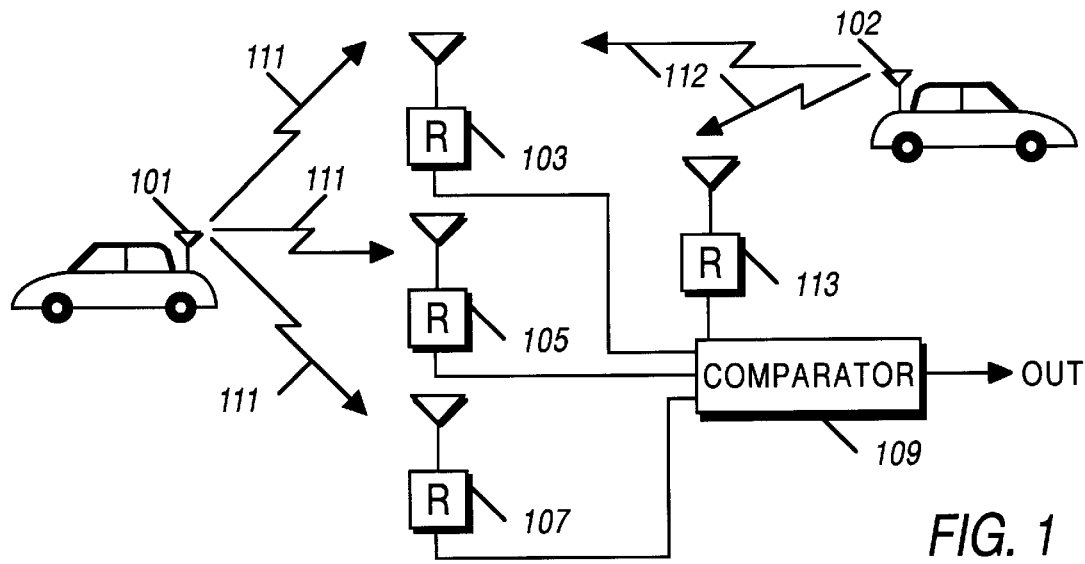
FIG. 1 is a block diagram of a communication system including a comparator in accordance with the invention.

The following describes an apparatus for and method of voting that provides efficient use of communication resources, while avoiding interference caused by other signal sources, particularly in a simulcast system. Although the same communication resource is used for transmission on multiple base stations or repeaters at the same time in a simulcast system, the present invention provides way to achieve increased signal throughput without causing interference with desired signals.

A method of the present invention comprises the steps of detecting, by a comparator operably coupled to K base stations, a change from sending a first message to a first subset of L base stations of the K base stations to sending a second message to a second subset of M base stations of the K base stations on one communication resource, where K, L, and M are integer numbers, and the first subset and the second subset contain at least one different base station, and upon completion of sending the first message to the first subset of L base stations, delaying sending the second message to the second subset of M base stations.

Another method of the present invention comprises the steps of detecting, by a comparator operably coupled to K base stations, a change from sending a first message to a first subset of L base stations of the K base stations to sending a second message to a second subset of M base stations of the K base stations, and the first subset and the second subset contain at least one different and upon completion of sending the first message to the first subset of L base stations, sending N1 idle frames to the first subset of L base stations, and sending N2 idle frames to the second subset of M base stations immediately prior to sending the second message to the second subset of M base stations, where K, L, M, N1, and N2 are integer numbers.

Optional steps to the above method comprising receiving, at a comparator, an inbound signal, comprised of J blocks, from the K base stations, where J is an integer number and for each of the J blocks, selecting a block of the inbound signal from one of the K base stations, yielding a voted signal. A block count for each of the K base stations is made by counting how many of the J blocks from the voted signal are from each of the K base stations. A base station is selected from among the K base stations, which base station has a block count that exceeds a threshold, yielding a selected base station. The selected base station may comprise the second subset of M base stations. The N1 idle frames may occupy a time greater than or equal to a rekey time for one of the K base stations, and the N2 idle frames may occupy a time greater than or equal to a dekey time for one of the K base stations.

Another method of the present invention comprises the steps of receiving, at a comparator, an inbound signal, comprised of J blocks, from K base stations and for each of the J blocks, selecting a block of the inbound signal from one of the K base stations, yielding a voted signal. A block count for each of the K base stations is made by counting how many of the J blocks from the voted signal are from each of the K base stations. A base station is selected from among the K base stations, which base station has a block count that exceeds a threshold, yielding a selected base station. A comparator operably coupled to K base stations detects a change from sending a first message to the selected base station to sending a second message to M base stations on one communication resource, where M is less than or equal to K, and upon completion of sending the first message to the selected base station, delays sending the second message to the M base stations, where J, K, and M are integer numbers.

Another method of the present invention comprises the steps of receiving, at a comparator, an inbound signal, comprised of J blocks, from K base stations and for each of the J blocks, selecting a block of the inbound signal from one of the K base stations, yielding a voted signal. A block count for each of the K base stations is made by counting how many of the J blocks from the voted signal are from each of the K base stations. A base station is selected from among the K base stations, which base station has a block count that exceeds a threshold, yielding a selected base station. A comparator operably coupled to K base stations detects a change from sending a first message to the selected base station to sending a second message to M base stations of the K base stations on one communication resource, where M is less than or equal to K. Upon completion of sending the first message to the selected base station, N1 idle frames are sent to the selected base station and N2 idle frames are sent to the M base stations immediately prior to sending the second message to the M base stations, where J, K, M, N1, and N2 are integer numbers.

Another method of the present invention comprises the steps of detecting, by a comparator operably coupled to K base stations, a change from sending a first message to a first subset of L base stations of the K base stations to sending a second message to a second subset of M base stations of the K base stations on one communication resource, wherein the first subset and the second subset contain at least one different base station and sending the first message to the first subset of L base stations. When none of the L base stations are among the second subset of M base stations, sending of the second message to the second subset of M base stations is delayed. When the first subset of L base stations is a subset of the second subset of M base stations, N2 idle frames are sent to the second subset of M base stations immediately prior to sending the second message to the second subset of M base stations. When the second subset of M base stations is a subset of the first subset of L base stations, N1 idle frames are sent to the first subset of L base stations immediately prior to sending the second message to the second subset of M base stations, where K, L, M, N1, and N2 are integer numbers. In addition, the step of delaying may comprise delaying for a time greater than or equal to the longer of a rekey time and a dekey time for one of the K base stations, and the N2 idle frames may occupy a time greater than or equal to a dekey time for one of the K base stations.

A block diagram of a communication system including a comparator in accordance with the invention is shown in FIG. 1. A first communication unit 101 transmits, via a radio frequency (RF) communication resource, a message 111 that is received by three remote receivers 103, 105, and 107, such as satellite receivers, base stations, or repeaters. Each of the receivers 103, 105, and 107 sends its received signal to the comparator 109, also known as a voter, typically by wireline communications. The comparator 109 receives and compares each message or message set of message frames from each of the receivers 103, 105, and 107 and outputs a message that is comprised of either an entire message from one of the receivers 103, 105, or 107 or a composite message comprised of portions of the messages received from one or more of the receivers 103, 105, and 107. The comparator may be an ASTROTAC™ or an ASTROTAC™ 3000 comparator, available from Motorola, Inc., modified to include the method set forth in FIG. 2, as described below. FIG. 1 also shows a second communication unit 102 that transmits, via an RF communication resource, a message 112 that is received by two remote receivers 103 and 113. Although only four receivers 103, 105, 107, and 113 are shown in the drawings, successful practice of the present invention may be obtained with only two receivers or with more than four receivers. In the preferred embodiment, the output of the voter 109 may-be sent to a base station or repeater such as a QUANTAR™ base station, available from Motorola, Inc., which base station retransmits the message, as is known in the art.

The timing diagrams of FIG. 2 through FIG. 4 and FIG. 6 through FIG. 14 reflect the use of a system having K base stations, where two different subsets, L and M, of the K base stations are the targets, or intended recipients, for the messages shown in the figures. In the preferred embodiment, these timing diagrams reflect data on the same communication resource, as it is intended to be transmitted from the base stations, which data is sent from the comparator 109 to the base stations 103, 105, 107, and 113, using the example system of FIG. 1 or FIG. 5.

Figure 2:
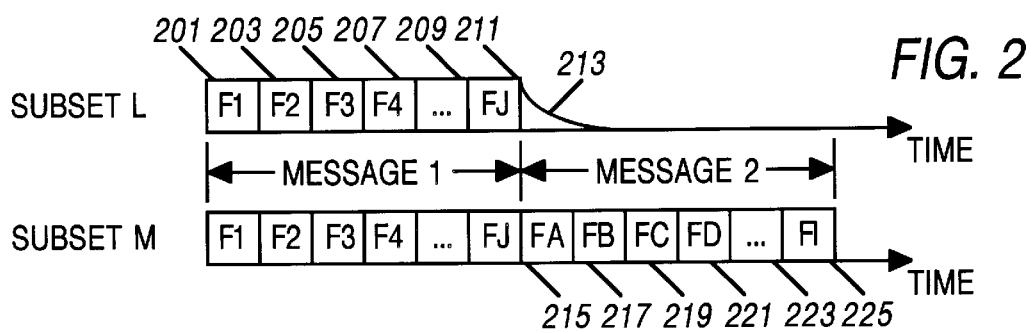
FIG. 2, FIG. 3, and FIG. 4 are timing diagrams showing dekey and rekey interference.
Figure 3:
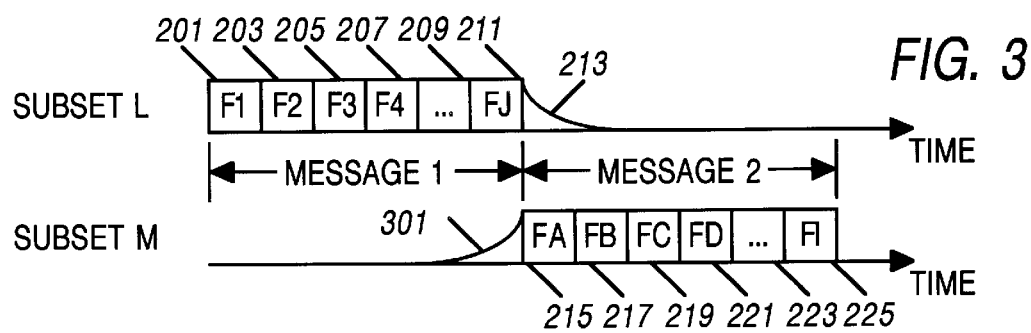
Figure 4:
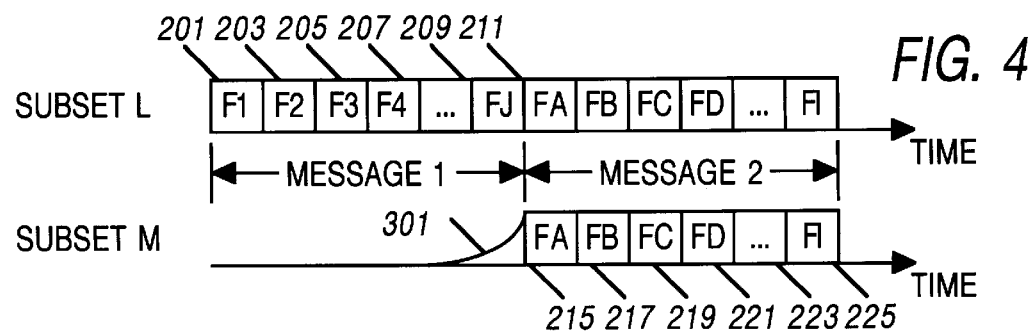

The timing diagrams of FIG. 2, FIG. 3, and FIG. 4 illustrate dekey and rekey interference with the reception of desired signals. As shown in FIG. 2, Message 1 is comprised of frames F1 through FJ 201, 203, 205, 207, 209, and 211, and Message 2 is comprised of frames FA through FI 215, 217, 219, 221, 223, and 225. In FIG. 2, the base stations that are members of subset L but are not members of subset M, dekey after transmitting Message 1, resulting in dekey interference 213 on the RF communication resource, which dekey interference 213 interferes with the beginning of Message 2. In the case of FIG. 3, the base stations of subset L are mutually exclusive from the base stations of subset M, in other words, there are no base stations that are in both subsets L and M. In this instance, the dekey interference 213 interferes with the beginning of Message 2, and in addition, rekey interference 301 from the subset M base stations interferes with the end of Message 1. In the situation shown in FIG. 4, where subset M is a subset of subset L, the base stations of subset M do not transmit message one, thus only a rekey interference 301 interferes with Message 1.

Figure 5:
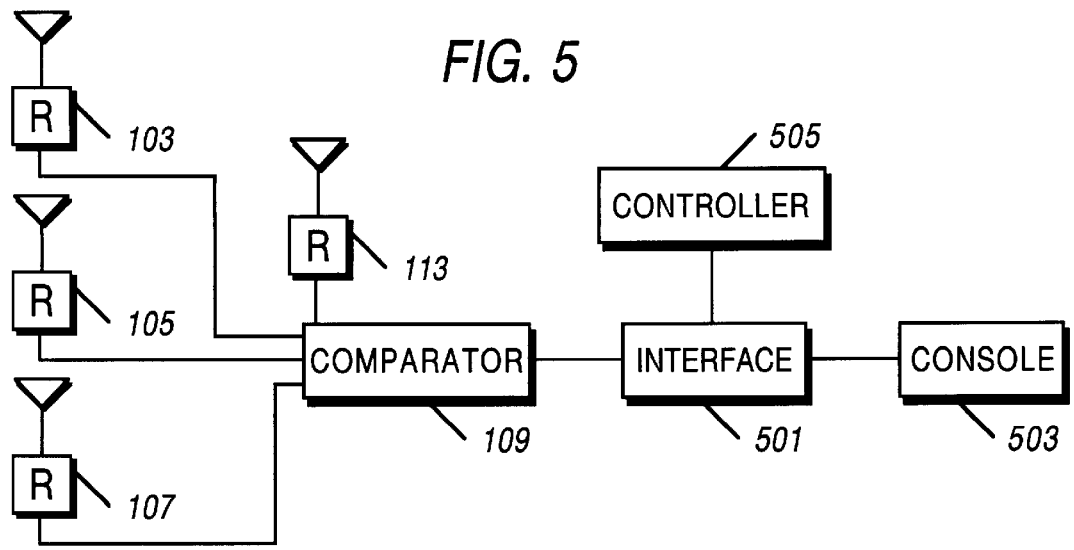
FIG. 5 is a block diagram of a communication system including a comparator, console, and controller in accordance with the invention.

A block diagram of a communications system including a comparator is shown in FIG. 5. In the preferred embodiment, the system shown is part of a simulcast voice and data communication system, such as is available from Motorola, Inc. As previously described, the receivers 103, 105, 107, and 113, which may be base stations or repeaters, are operably coupled to comparator 109. An interface 501 is coupled to the comparator, and a console 503, and a controller 505 are coupled to the interface 501 in the preferred embodiment. The interface 501 provides signal processing to the console 503, thereby providing dispatch access to signals from the comparator 109 and receivers/base stations 103, 105, 107, and 113. The controller 505 also receives processed signals from the interface. In the preferred embodiment, the comparator 109 sends voted signals or messages to the controller 505, which, in the preferred embodiment, is a data network gateway, such as an RNC 2000 data network gateway available from Motorola, Inc. The controller 505 receives voted data signals and sends responses to the appropriate repeater/base station/receiver 103, 105, 107, and 113 at the appropriate site. In the preferred embodiment, the controller 505 sends data messages to the comparator 109, along with indications as to destination base stations 103, 105, 107, and 113 for the data messages, and the comparator 109 performs idle frame and/or dekey/rekey functions to ensure the frames are sent by the base stations/repeaters 103, 105, 107, and 113 without interference.

Figure 6:
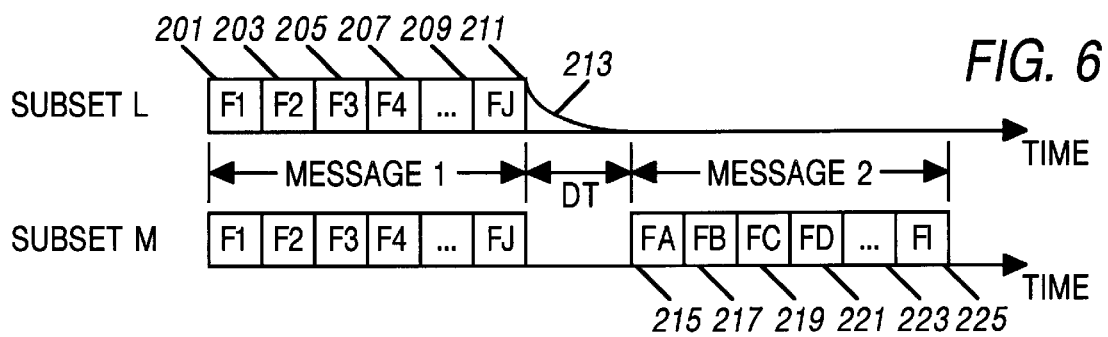
FIG. 6, FIG. 7, and FIG. 8 are timing diagrams showing subsequent message delay in accordance with the invention.
Figure 7:
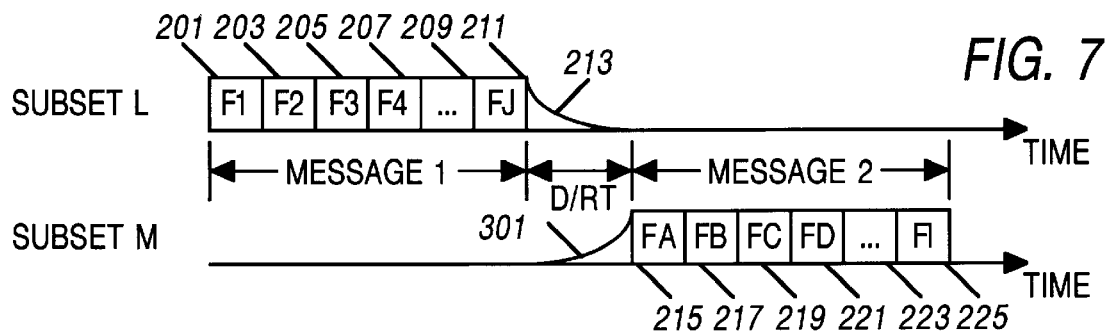
Figure 8:
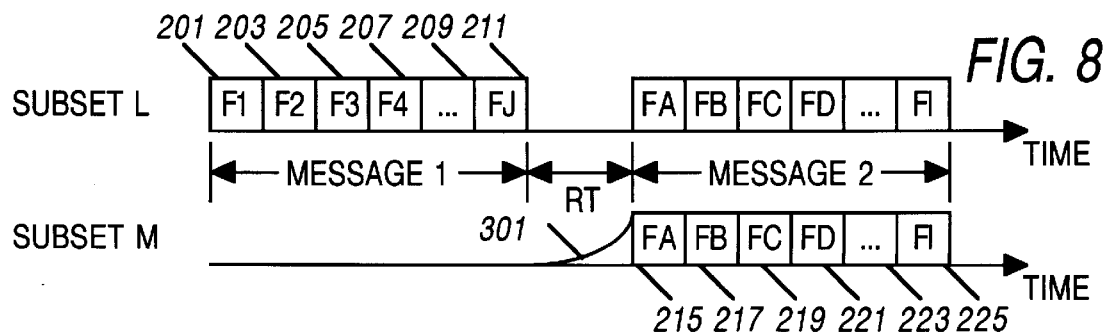
Figure 15:
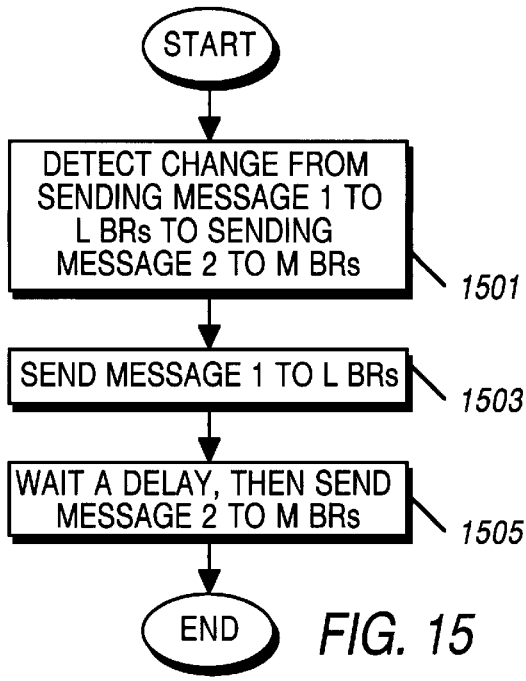
FIG. 15 is a flowchart showing introduction of subsequent message delay in accordance with the invention.

Timing diagrams showing subsequent message delay are shown in FIG. 6, FIG. 7, and FIG. 8. In FIG. 6, where subset L is a subset of subset M, a delay is introduced subsequent to the end of transmission of message one. After this delay, Message 2 is then sent for transmission. This delay time is greater than or equal to the dekey time necessary for the subset L base stations to dekey and for the subset M base stations to rekey. In one embodiment of the invention, the delay is greater than or equal to the dekey time (DT) for one of the K base stations. In FIG. 7, where subset L and subset M are mutually exclusive subsets of the K base stations, the delay is greater than or equal to the longer of a dekey time or a rekey time of one of the base stations 103. In FIG. 8, where subset M is a subset of subset L, Message 2 is delayed from message one by a time RT, which is greater than or equal to a rekey time associated with one of the base stations 103. For simplicity sake, a single delay time may be used in each of the three cases of FIG. 6, FIG. 7, and FIG. 8, which time is greater than or equal to the longer of a rekey time and a dekey time for one of the K base stations. In other words, the longest rekey time or dekey time is used as the delay between sending Message 1 and Message 2 in all cases. Using a single delay time is more simple, because it prevents the need to distinguish between the relationship between subset L and subset M. A flowchart showing the method employed for FIG. 6, FIG. 7, and FIG. 8 is shown in FIG. 15.

Figure 9:
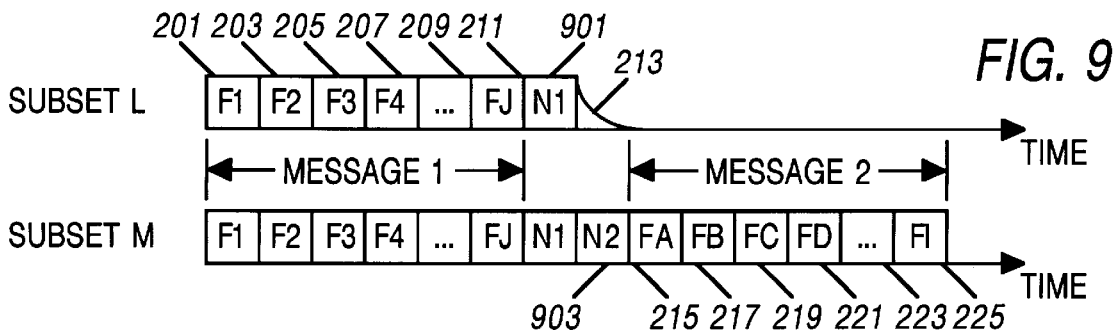
FIG. 9, FIG. 10, and FIG. 11 are timing diagrams showing transmission of idle frames in accordance with the invention.
Figure 10:
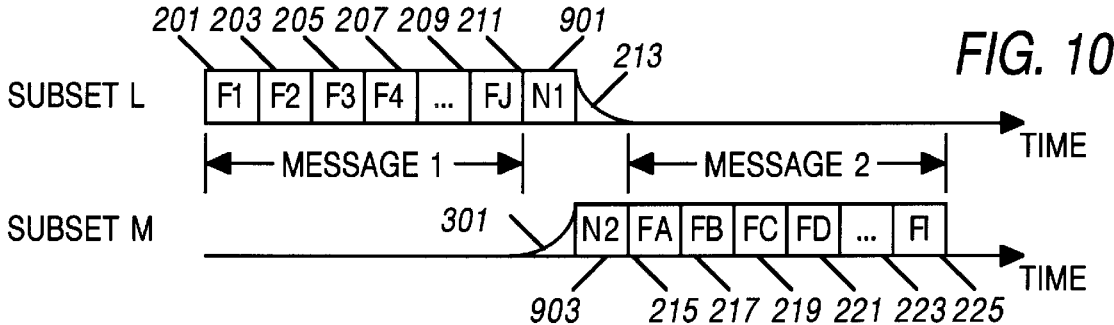
Figure 11:
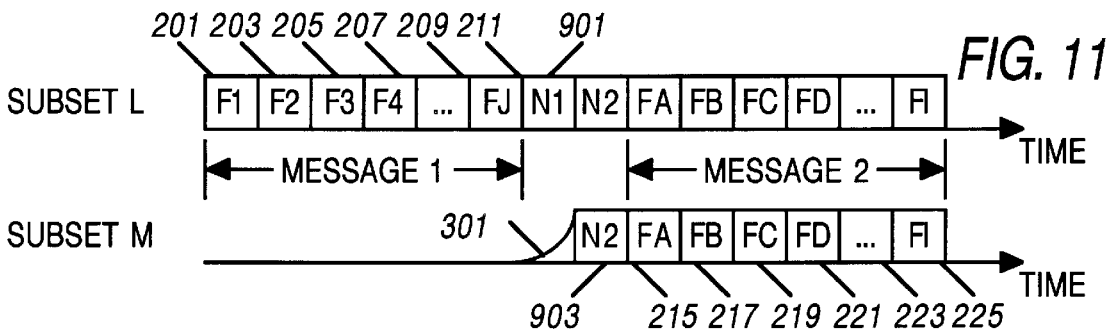
Figure 16:
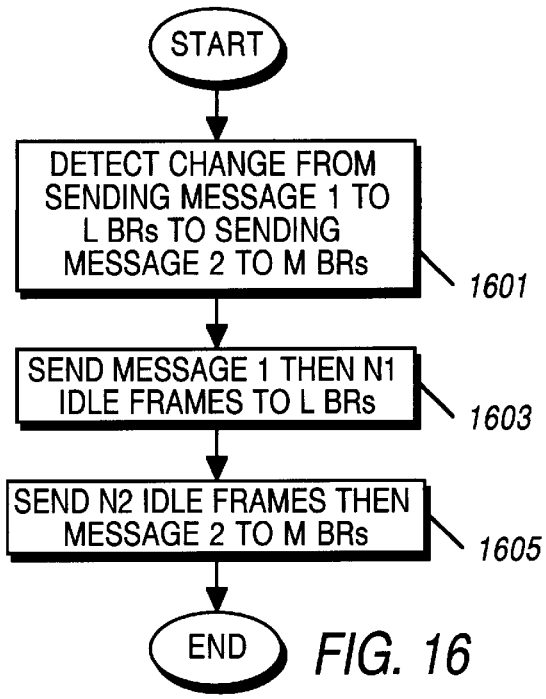
FIG. 16 is a flowchart showing transmission of idle frames in accordance with the invention.

Another embodiment of the present invention is illustrated in the timing diagrams of FIG. 9, FIG. 10, and FIG. 11. The element of the present invention illustrated in this set of figures is the introduction of the transmission of a number of idle frames between the transmission of Message 1 and Message 2. In a simplified version of this method, a number N1 of idle frames 901 is transmitted after the transmission of Message 1. In addition, prior to transmission of Message 2, a number N2 of idle frames 903 are transmitted to prevent interference by the dekey interference 213. Thus, the base stations in subset M do not dekey between transmission of Message 1 and Message 2, but are not subject to dekey interference 213 with the beginning of Message 2, due to transmission of idle frames 903 while the subset L base stations are dekeying. In FIG. 10, where subset L and subset M are mutually exclusive sets of base stations, the N1 idle frames 901 are transmitted to prevent the rekey interference 301 from the subset M base stations from interfering with the end of Message 1. Similarly, transmission of the N2 idle frames 903 prevents the dekey interference 213 from the subset L base stations from interfering with the beginning of Message 2. In FIG. 11, where subset M is a subset of subset L, the subset L base stations transmit N1 followed by N2 idle frames prior to transmitting message two, and the subset M base stations transmit N2 idle frames prior to transmission of Message 2. The transmission of the N1 idle frames 901 prevents the rekey interference 301 by the subset M base stations from interfering with the subset L transmission of Message 1. In the embodiment shown by the timing diagrams of FIG. 9, FIG. 10, and FIG. 11, N1 idle frames 901 are automatically transmitted after Message 1, and N2 idle frames 903 are automatically transmitted before Message 2 in each instance in order to avoid having to determine the relationship between subset L and subset M, i.e., it does not matter whether subset L is part of or not part of subset M. Thus, the preferred embodiment as shown in FIG. 9, FIG. 10, and FIG. 11 is a simplified algorithm. A flowchart showing the method employed for FIG. 9, FIG. 10, and FIG. 11 is shown in FIG. 16.

Figure 12:
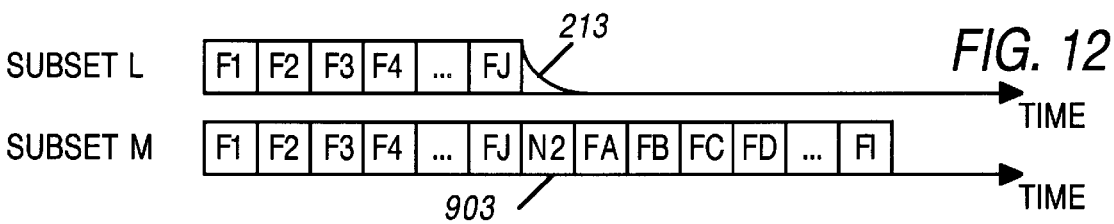
FIG. 12, FIG. 13, and FIG. 14 are timing diagrams showing transmission of idle frames or introduction of delay in accordance with the invention.
Figure 13:
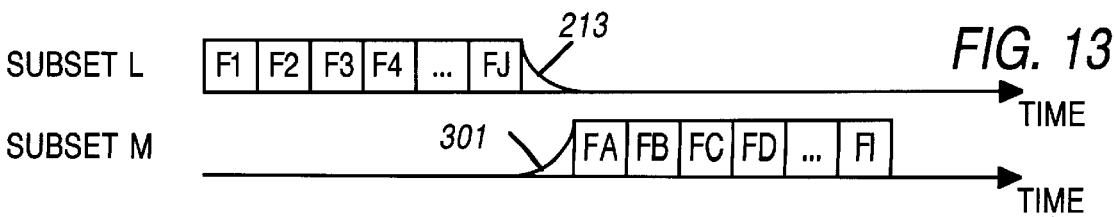
Figure 14:
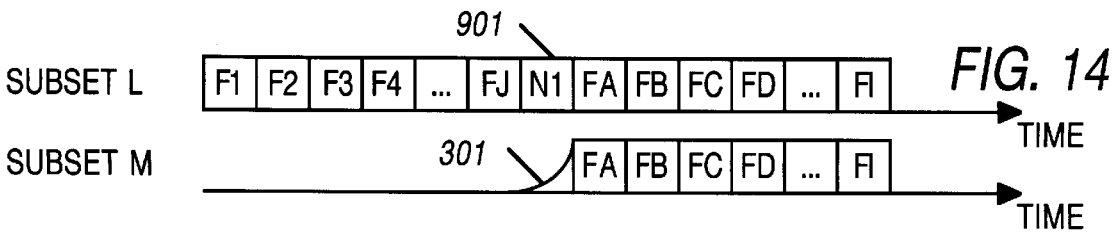
Figure 17:
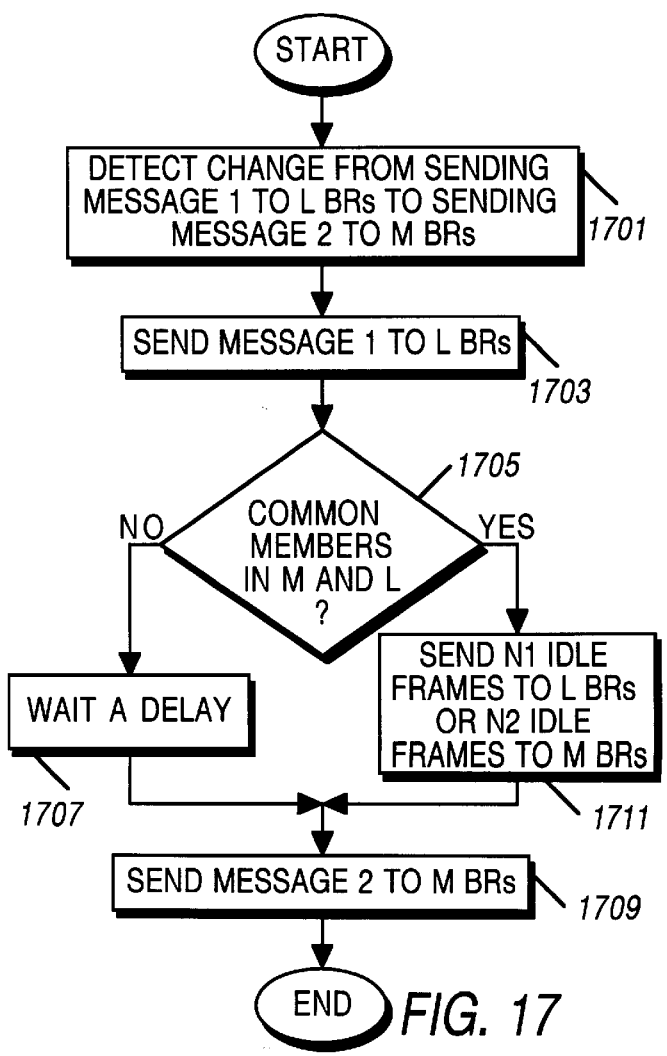
FIG. 17 is a flowchart showing transmission of idle frames or introduction of delay in accordance with the invention.

Timing diagrams showing transmission of idle frames or introduction of delay are shown in FIG. 12, FIG. 13, and FIG. 14. In this instance, a more complex algorithm is provided that accommodates greater data throughput for each communication resource by eliminating the need to transmit both the N1 idle frames 901 and the N2 idle frames 903. In FIG. 12, where subset L is a subset of subset M, the N2 idle frames 903 are transmitted between transmission of Message 1 (F1–FJ) in the transmission of Message 2 (FA–FI), where the N2 idle frames 903 prevent the dekey interference 213 from interfering with Message 2. As shown in FIG. 13, where subset L and subset M are mutually exclusive subsets, a delay is introduced between the transmission of frame FJ, the end of Message 1, and the beginning of transmission of frame FA at the beginning of Message 2. This delay is the longer delay of the time of the dekey or rekey of the base station, such that no interference between the messages is created. In FIG. 14, where subset M is a subset of subset L, N1 idle frames 901 are transmitted between transmission of frame FJ and frame FA by the subset L base stations, to prevent the rekey interference 301 from interfering with the end of Message 1. Another way of viewing this embodiment is to say for FIG. 12 when the L base stations are a subset of the M base stations, N1 equals zero, for FIG. 13 when first subset of L base stations and the second subset of M base stations are mutually exclusive subsets of the K base stations, N1 and N2 equal zero; and for FIG. 14 when the M base stations are a subset of the L base stations, N2 equals zero. A flowchart showing this method is shown in FIG. 17.

In the preferred embodiment, for FIG. 9 through FIG. 14, the N1 idle frames occupy a time greater than or equal to a rekey time for one of the K base stations and the N2 idle frames occupy a time greater than or equal to a dekey time for one of the K base stations. In the preferred embodiment, N1 and N2 are integers greater than or equal to zero, and K, L, and M are integer numbers greater than or equal to one. The various embodiments of the present invention are particularly useful when handling the situations: a) when L equals K and M equals 1, i.e., when transmission shifts from all base stations transmitting to only one base station transmitting; b) when L and M both equal 1, i.e., when transmission shifts from one base station transmitting to a different base station transmitting; and c) when L equals 1 and M equals K, i.e., when transmission shifts from only one base station transmitting to all base stations transmitting.

A flow chart showing introduction of subsequent message delay as shown in the flow chart of FIG. 15, is reflected in the timing diagrams of FIG. 6, FIG. 7, and FIG. 8. At step 1501, a change is detected from sending Message 1 to L BRs to sending Message 2 to M BRs, where "BR" will be used to designate a base station, repeater, or receiver. At step 1503, message one is sent to the L BRs. At step 1505, after waiting a delay after step 1503, Message 2 is sent to the M BRs, and the process ends.

A flow chart showing transmission of idle frames is shown in FIG. 16, as reflected in the timing diagrams of FIG. 9, FIG. 10, and FIG. 11. At step 1601, after detecting a change from sending Message 1 to L BRs and sending Message 2 to M BRs. At step 1603, Message 1 is sent then N1 idle frames are sent to the L BRs. At step 1605, N2 idle frames then Message 2 are sent to the M BRs, and the process ends.

A flow chart showing transmission of idle frames or introduction of delay is shown in FIG. 17. Timing diagrams illustrating this method are shown in FIG. 12, FIG. 13, and FIG. 14. At step 1701, a change is detected from sending Message 1 to L BRs to sending Message 2 to M BRs. At step 1703 Message 1 is sent to the L BRs. At step 1705, it is determined if there are common members between subsets M and L. If there are no common members, a delay is waited at step 1707, and then the process continues with step 1709, where Message 2 is sent to the M BRs, after which the process ends. The delay at step 1707 is greater than or equal to the longer time of a rekey time and a dekey time. If at step 1705 common members are present in subset M and subset L, at step 1711, N2 idle frames are sent to the M BRs when the L base stations are a subset of the M base stations, and when the L base stations are a subset of the M base stations, N1 idle frames are sent to the L BRs, and the process continues with step 1711.

Figure 18:
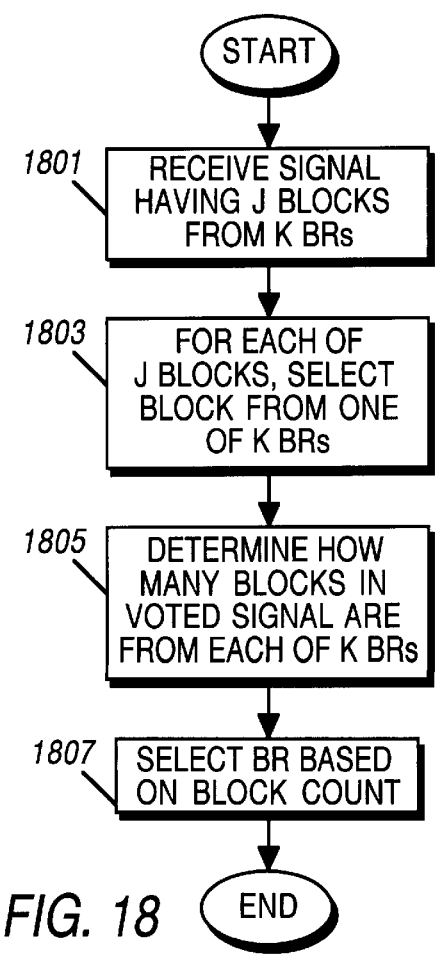
FIG. 18 is a flowchart showing selection of a base station for a site-steered message in accordance with the invention.

A flow chart showing selection of a base station for a site-steered message as shown in FIG. 18. In the preferred embodiment, a site-steered message is an outbound data message that comes from the controller 505 to the user, after a base station is selected by the controller 505 through which the message is transmitted or steered to the user, by appending the base station address to the outbound data message. In the preferred embodiment, data messages are messages containing data meaningful to a user, which messages are used by data applications running on data terminals connected to a mobile or portable radio. At step 1801, a signal having J blocks from K BRs is received. At step 1803, the voting process takes place, wherein for each of the J blocks, one block from one of the K BRs is selected as the best block for each of the J blocks, the resultant J blocks, yielding a voted signal. At step 1805, it is determined how many blocks in this voted signal are from each of the K BRs. At step 1807, a BR is selected based on the block count. For example, the BR with the most number of voted blocks is likely to be chosen. In case of a tie, it does not matter which of the tied BRs is selected. In systems where voting is performed on a receive only sites, i.e., where no transmitters are present, a site-steered message is sent to a base station corresponding to a user-supplied mapping of receivers to transmitters from base stations at other location(s), thus the base station selected is a base station corresponding to a selected receiver in a user map.

The present invention is very useful for avoiding interference while still using a base station to transmit two messages as quickly as possible without resulting interference between the messages. This method is most useful in voice/data systems where the RF topology is designed to support portable voice users who also want to send data, where voting and simulcast are part of the system. In such an environment, simulcasting data does not work well, due to the bit error rates related to simulcast systems. In order to avoid the high bit error rate due to simulcasting, the data is steered to the subscriber for which the data is intended, through a particular base station, thereby mono-casting the actual data messages. This invention allows data messages steered to different transmitters to be sent as close together as possible, thereby increasing total data throughput on a communication resource, while avoiding on-air collisions with adjacent sites, which collisions would dramatically decrease the total data throughput.

What is claimed is:

1. A method comprising the steps of:

detecting, by a comparator operably coupled to K base stations, a change from sending a first message to a first subset of L base stations of the K base stations to sending a second message to a second subset of M base stations of the K base stations on one communication resource, where K, L, and M are integer numbers, and the first subset and the second subset contain at least one different base station; and upon completion of sending the first message to the first subset of L base stations, delaying sending the second message to the second subset of M base stations.

2. The method of claim 1, wherein L equals K and M equals 1.

3. The method of claim 1, wherein L equals 1 and M equals 1.

4. The method of claim 1, wherein L equals 1 and M equals K.

5. The method of claim 1, wherein the step of delaying comprises delaying for a time greater than or equal to the longer of a rekey time and a dekey time for one of the K base stations.

6. The method of claim 1, further comprising the steps of:

receiving, at a comparator, an inbound signal, comprised of J blocks, from the K base stations, where J is an integer number;

for each of the J blocks, selecting a block of the inbound signal from one of the K base stations, yielding a voted signal;

counting how many of the J blocks from the voted signal are from each of the K base stations, yielding a block count for each of the K base stations; and selecting a base station from among the K base stations, which base station has a block count that exceeds a threshold, yielding a selected base station.

7. The method of claim 6, wherein the selected base station comprises the second subset of base stations.

8. A method comprising the steps of:

detecting, by a comparator operably coupled to K base stations, a change from sending a first message to a first subset of L base stations of the K base stations to sending a second message to a second subset of M base stations of the K base stations on one communication resource, where K, L, and M are integer numbers, and the first subset and the second subset contain at least one different base station;

upon completion of sending the first message to the first subset of L base stations, sending N1 idle frames to the first subset of L base stations; and sending N2 idle frames to the second subset of M base stations immediately prior to sending the second message to the second subset of M base stations, where K, L, M, N1, and N2 are integer numbers.

9. The method of claim 8, wherein L equals K and M equals 1.

10. The method of claim 8, wherein L equals 1 and M equals 1.

11. The method of claim 8, wherein L equals 1 and M equals K.

12. The method of claim 8, wherein the N1 idle frames occupy a time greater than or equal to a rekey time for one of the K base stations, and the N2 idle frames occupy a time greater than or equal to a dekey time for one of the K base stations.

13. The method of claim 8, wherein N1 equals zero when the L base stations are a subset of the M base stations, N1 and N2 equal zero when first subset and the second subset are mutually exclusive subsets of the K base stations, and N2 equals zero when the M base stations are a subset of the L base stations.

14. The method of claim 8, further comprising the steps of:

receiving, at a comparator, an inbound signal, comprised of J blocks, from the K base stations, where J is an integer number;

for each of the J blocks, selecting a block of the inbound signal from one of the K base stations, yielding a voted signal;

counting how many of the J blocks from the voted signal are from each of the K base stations, yielding a block count for each of the K base stations;

selecting a base station from among the K base stations, which base station has a block count that exceeds a threshold, yielding a selected base station.

15. The method of claim 14, wherein the selected base station comprises the second subset of M base stations.

16. A method comprising the steps of:

receiving, at a comparator, an inbound signal, comprised of J blocks, from K base stations;

for each of the J blocks, selecting a block of the inbound signal from one of the K base stations, yielding a voted signal;

counting how many of the J blocks from the voted signal are from each of the K base stations, yielding a block count for each of the K base stations;

selecting a base station from among the K base stations, which base station has a block count that exceeds a threshold, yielding a selected base station;

detecting, by a comparator operably coupled to K base stations, a change from sending a first message to the selected base station to sending a second message to M base stations on one communication resource, where M is less than or equal to K; and upon completion of sending the first message to the selected base station, delaying sending the second message to the M base stations, where J, K, and M are integer numbers.

17. The method of claim 16, wherein the step of delaying comprises delaying for a time greater than or equal to the longer of a rekey time and a dekey time for one of the K base stations.

18. A method comprising the steps of:

receiving, at a comparator, an inbound signal, comprised of J blocks, from K base stations;

for each of the J blocks, selecting a block of the inbound signal from one of the K base stations, yielding a voted signal;

counting how many of the J blocks from the voted signal are from each of the K base stations, yielding a block count for each of the K base stations;

selecting a base station from among the K base stations, which base station has a block count that exceeds a threshold, yielding a selected base station;

detecting, by a comparator operably coupled to K base stations, a change from sending a first message to the selected base station to sending a second message to M base stations of the K base stations on one communication resource, where M is less than or equal to K;

upon completion of sending the first message to the selected base station, sending N1 idle frames to the selected base station; and sending N2 idle frames to the M base stations immediately prior to sending the second message to the M base stations, where J, K, M, N1, and N2 are integer numbers.

19. The method of claim 18, wherein the N1 idle frames occupy a time greater than or equal to a rekey time for one of the K base stations, and the N2 idle frames occupy a time greater than or equal to a dekey time for one of the K base stations.

20. A method comprising the steps of:

detecting, by a comparator operably coupled to K base stations, a change from sending a first message to a first subset of L base stations of the K base stations to sending a second message to a second subset of M base stations of the K base stations on one communication resource, wherein the first subset and the second subset contain at least one different base station;

sending the first message to the first subset of L base stations;

when none of the L base stations are among the second subset of M base stations, delaying sending the second message to the second subset of M base stations;

when the first subset of L base stations is a subset of the second subset of M base stations, sending N2 idle frames to the second subset of M base stations immediately prior to sending the second message to the second subset of M base stations; and when the second subset of M base stations is a subset of the first subset of L base stations, sending N1 idle frames to the first subset of L base stations immediately prior to sending the second message to the second subset of M base stations, where K, L, M, N1, and N2 are integer numbers.

21. The method of claim 20, wherein the step of delaying comprises delaying for a time greater than or equal to the longer of a rekey time and a dekey time for one of the K base stations, and wherein N2 idle frames occupy a time greater than or equal to a dekey time for one of the K base stations.

* * * * *